Aug. 9, 1932.                    F. NEUMANN                    1,870,344
                                   BALANCE
                              Filed June 9, 1927           2 Sheets-Sheet 2
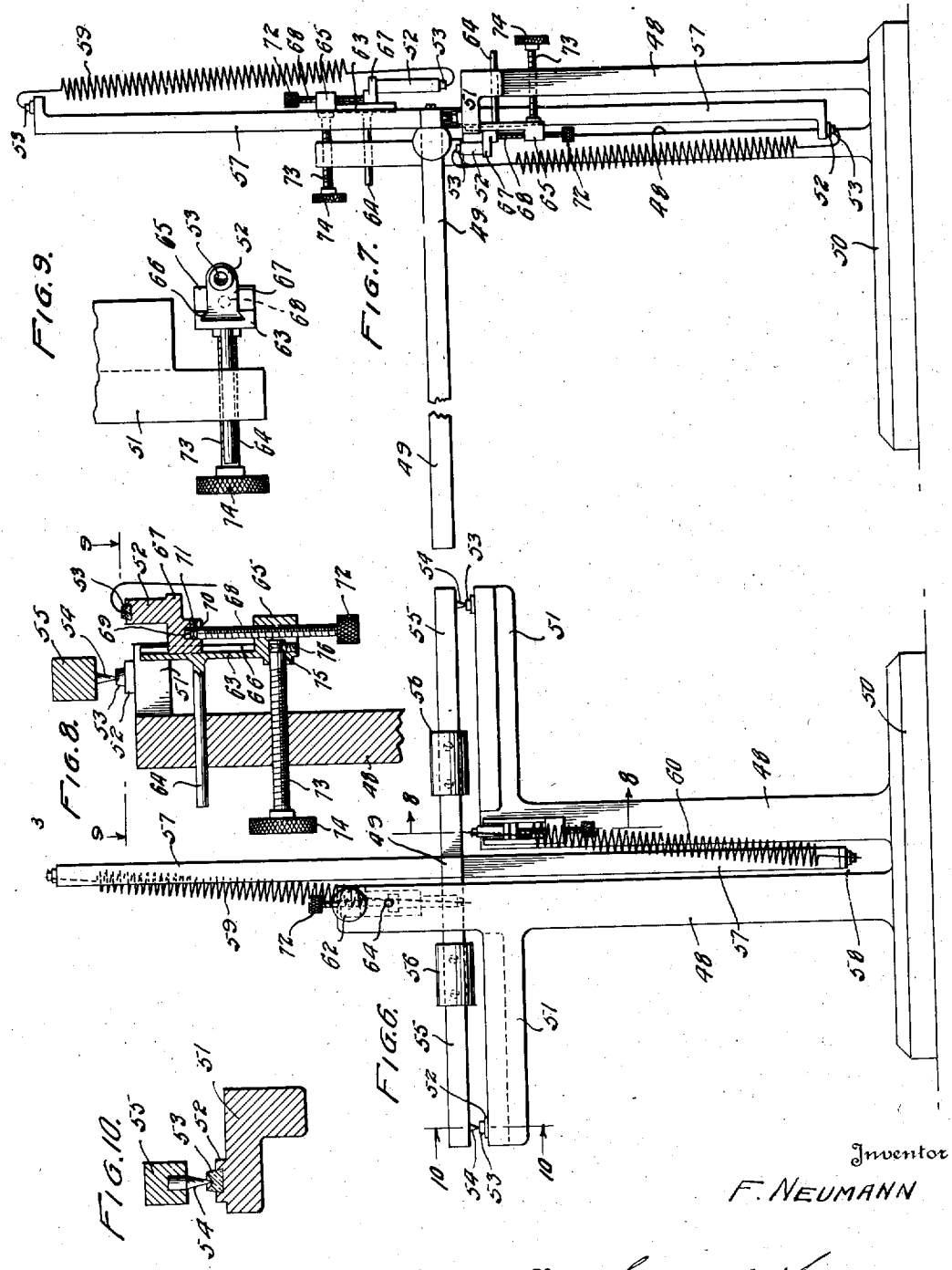
Inventor
F. NEUMANN
By Semmes & Semmes
Attorneys Patented Aug. 9, 1932

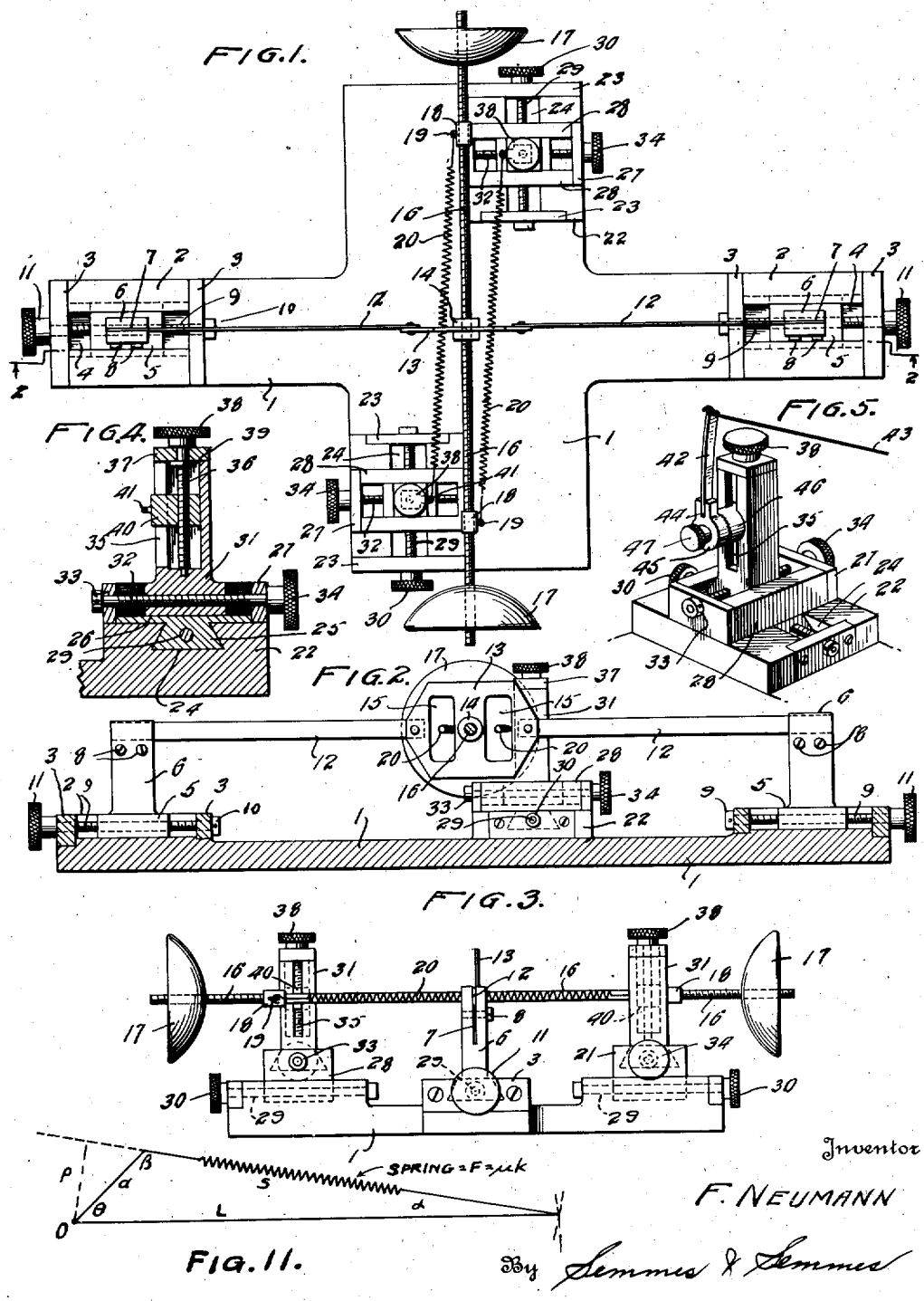
Aug. 9, 1932.  F. NEUMANN  1,870,344
BALANCE
Filed June 9, 1927    2 Sheets-Sheet 1

1,870,344

UNITED STATES PATENT OFFICE

FRANK NEUMANN, OF WASHINGTON, DISTRICT OF COLUMBIA

BALANCE

Application filed June 9, 1927. Serial No. 197,733.

This invention relates to balances and more particularly to the method of and apparatus for increasing the sensitivity of mechanical balances, pendulums and similar vibrating systems.

Heretofore, balances of the pivot type have presented an outstanding disadvantage. The pivot or knife edges require constant and accurate adjustment and their relatively delicate mountings preclude their use in field work. The suspension type may be made more rugged than the pivot type but the sensitivity of such systems is not as great as is desired for precise measurements.

It is an object of this invention to devise a method of increasing the sensitivity of mechanical balances.

Another object is to provide a balance of the suspension type which is rugged in structure and yet possesses great sensitivity.

A further object is to provide an apparatus of the character referred to which is simple in design and susceptible of accurate and facile adjustment.

Yet another object is to provide a method of increasing the sensitivity of vibrating balances by compensating for the normal restoring forces.

With these and other equally important objects in view the invention comprehends the utilization, by means of suitable apparatus, of a force which tends to oppose the normal restoring forces in a vibrating system to thereby increase its sensitivity.

To render the invention more easily understood I have shown in the accompanying drawings devices which embody its underlying principles. In these drawings the reference numerals refer to similar parts throughout the several views, of which:

Figure 1 is a top plan view of a torsion balance.

Fig. 2 is a longitudinal central section of the device taken on line 2—2 of Fig. 1.

Fig. 3 is a side elevation of the balance as shown in Fig. 1.

Fig. 4 is an enlarged detail of the adjustable mount for the compensating device.

Fig. 5 is a detail of a modification of this mount.

Fig. 6 is a rear elevation of a seismometer embodying the invention.

Fig. 7 is a side elevation of the device shown in Fig. 6.

Fig. 8 is a view taken on the line 8—8 of Fig. 6 showing the spring mount in enlarged section.

Fig. 9 is a top view taken on line 9—9 of Fig. 8.

Fig. 10 is a detail view of the bearing pivot of the device showing a section taken on line 10—10 of Fig. 6.

Fig. 11 is a diagram illustrating the principle of a sensitivity spring and balancing spring, as embodied in my invention.

When a simple suspension balance, such as is shown in Fig. 1, is displaced from its position of equilibrium it oscillates about its point of suspension. The restoring force depends on the gravity and torsional constants of the particular balance and the displacement. As balances are ordinarily construed the restoring forces are relatively large and cause a rapid oscillation of the balance arm and hence precludes any great degree of sensitivity.

I have found that the sensitivity of such a balance can be remarkably increased by introducing a torque which opposes the normal restoring forces. An example of an apparatus which utilizes this idea is shown in Fig. 1. This comprises a base pedestal 1 which may be made of any desired shape or substance as convenience and appearance dictate. At opposite parts of the pedestal there are mounted the suspension supports designated generally by the numeral 2. Each support comprises a base plate 3 which may be formed integrally with or detachably from the pedestal. If it is constructed as a detachable member it may be secured to the pedestal by any suitable means.

The plate 3 is formed with apertured end pieces and a central intermediate slot 4. Seated in the slot for sliding movement therein is a securing member for the suspension wire. The member includes a base piece 5 having a reduced vertical extension arm 6. If desired, the sides of the base piece and the contacting wall of the slot may be so formed as to present a dovetailed or similar engagement to restrain the tendency of the securing member to twist. The upper end of the arm 6 is slotted at 7 (see Figs. 1 and 3) to receive the suspension member. As will be described more fully hereinafter, when the suspension ribbon or wire has been placed in the slot it may be securely fastened therein by tightening the screws 8. This suspension may be formed of quartz, steel, bronze or similar material.

The suspension mount is provided with means to vary the tension in the suspension member. This may comprise a shaft 9 journalled for rotating movement in the end pieces 3. Intermediate its ends the shaft is threaded and is adapted to engage the correspondingly threaded bore of the sliding plate 5. At one extreme end, the shaft is formed with a detachable head 10 and at the other with a knurled, shouldered knob 11.

The operation of the suspension mount will be apparent from this description of the several parts. When it is desired to assemble the device the ends of the suspension ribbon or wire 12 are inserted in the slots 7 and the screws 8 tightened to securely hold these parts together. After the suspension member has been fixed to the support its tension may be adjusted to any desired extent by rotating the knobs 11 in the proper direction.

The suspension members 12 are secured at their adjacent ends to a central plate 13, in any desired manner. As shown, particularly in Fig. 2, the plate is provided with a centrally threaded collar 14 and a plurality of vertical slots 15, the function of which will appear more fully hereinafter. This plate is adapted to receive the balance arm or rod 16. As shown, this comprises a member having threaded central and end sections. The threaded central section is adapted to register with the threaded bore of the collar 14 and the threaded end sections receive and hold the balance weights 17. The screw threaded engagement of the balance weight permits longitudinal adjustment and allows an accurate balance to be obtained. In the device described, when the balance arm 16 is displaced in the vertical plane, it will oscillate about the point defined by the center of the collar 14, assuming the arm to be exactly balanced. The period of oscillation will depend primarily on the forces exerted on the system which tend to restore equilibrium. I have found that if a device of this character is made up having a metal rod, corresponding to bar 16, of approximately a foot in length on which is fixed weights of about 5 ounces each, and a very small displacement weight is placed on one end of the rod, the balance is displaced approximately 2 millimeters. If a force is now introduced which acts in a direction to oppose the restoring forces in the system, the displacement due to the applied weight may be easily increased to 24 mm., i. e., the sensitivity of the device may be increased 1,200 percent.

In Fig. 1, I have shown a specific means for introducing this opposing force. This comprises essentially a spring stretched between a point on the balance, on one side of the center of oscillation and a point adjacent the balance on the other side of the center. To render the system symmetrical two springs are preferably provided. These are attached to the balance on opposite sides of the center of oscillation.

To obtain a convenient assemblage, the rod 16 is provided with a collar 18, fixed to the shaft in any convenient manner. This collar is provided with an apertured lug 19 adapted to receive an end of a helical spring 20. From the collar 19, the spring extends, in close proximity to the rod, through the elongated aperture 15 of the central plate. The other end of the spring is secured to an adjustable mount designated generally by the numeral 21.

The spring mount comprises a number of members which are so related as to provide for adjustment in three directions. As will be explained more fully, one of the movements permitted by the preferred structure is in a horizontal plane parallel to the balance bar 16. A second movement attained by the mounting is in a horizontal plane normal to the balance rod. A third movement is in a vertical direction.

The spring mount comprises a bed plate 22 which may be formed integrally with the pedestal 1, if desired. This plate is provided with the apertured end pieces 23 and a central groove 24. This groove is preferably dovetailed in cross-section, but it is to be understood that it may be of any suitable shape. Mounted in the groove for longitudinal movement therein is a correspondingly shaped member 25 constituting a depending extension of the plate 26. Secured to the plate 26 are the side pieces 27 of a rectangular frame 28. A shaft 29 is journalled adjacent its extremities in the end pieces 23 and intermediate its ends is threaded to engage the threaded bore of the movable plate 26. The shaft is provided with an adjusting knob 30. It will be seen that upon rotation of the shaft the plate 26 will be moved longitudinally in the slot 24 and will carry with it the rectangular frame 28 and the parts mounted thereon.

The frame 28 is provided with members adapted to permit vertical and horizontal adjustment of the spring mount. These adjustments are attained by mounting a pedestal 31 for lateral movement within the frame 28. The base portion of the pedestal 31 is transversely apertured and grooved to receive a threaded central section of the shaft 32. This shaft member, like the other adjusting shafts described hereinbefore, is journaled near its ends in adjacent frames, in this case the frame members 27. The collar 33 on one end of the shaft and the shoulder portion on the knob 34 acts conjointly to prevent longitudinal movement of the shaft itself. It will be apparent that on rotation of the shaft the pedestal 31 and its associated parts will be moved in a horizontal plane and normal to the plane of the balance bar 16.

The pedestal 31 is so constructed as to mount the spring securing member. To do this the pedestal is formed with a hollow center and a longitudinal aperture 35, shown particularly in Fig. 4. Into this aperture protrudes a threaded shaft 36, journaled at its two ends in the base portion 31 and top cover 37 respectively. The exterior end of this shaft is provided with a knob 38. The shoulder of the knob cooperates with a collar 39, to prevent longitudinal movement of the shaft. Mounted within the interior of the pedestal extension is a sliding member 40. This is centrally apertured and the bore is grooved to register with the threads on the adjusting shaft 36. The member 40 is provided with an apertured lug 41 which is adapted to receive the end of the spring. It will be understood that this may be a simple lug or may be provided with a jewel bearing for the spring.

The triple adjustment of the spring mount will be appreciated from the foregoing description. Upon rotation of the knob 30, the plate 26, frame 28 and pedestal 31 will be moved longitudinally in a plane parallel with the suspension bar. This movement will vary the tension in the spring 20 and will enable an equal tension to be obtained in each spring of the bar and thereby secure a delicate balance of the instrument.

When it is desired to move the spring mount in a horizontal plane perpendicular to the plane of the balance bar this may readily be done by rotating the knob 34. Rotative movement of this member will effect lateral movement of the pedestal 31 and with it the spring mounting member 40. While a small twisting moment obtains in the described device it is of minor importance and may be minimized in the well known manner. As is known, by moving the point of suspension closer to the bar the effective couple may be correspondingly diminished thereby decreasing twisting effect in the spring.

The third or vertical adjustment is obtained by rotating the knob 38 and its integral shaft 36. This rotation causes movement of the block 40 and the end of the spring secured thereto. I have found in practice that the greatest sensitivity can be obtained when that end of the spring which is attached to the spring mount is substantially in the same horizontal plane as the balance arm, when the latter is in its neutral position. By moving the block 40 upwardly or downwardly through the intermediacy of the shaft 36, this position may readily be attained for each spring. The vertical adjustment of the member 40 as will be understood controls the couple in the vertical plane, varying the distance to the horizontal plane of the bar.

In Fig. 5 I have shown a modification of the spring mount. In lieu of the helical spring 20, I may use a leaf spring 42 as the means to apply force to the suspension bar 16. At one end this is formed with a reduced portion or eye for the reception of a looped end of a tension member 43. This member may be made of any suitable material which is light and of sufficient strength, such as quartz fiber or a metal wire. The base of the leaf spring is set in a split 44 of the collar 45. This collar is provided with a serrated face adapted to engage corresponding serrations on a stud 46. The stud 46 forms an extension of the sliding block 40 and is formed with a reduced portion to provide a stub shaft on which to mount the collar 44. The end of this shaft is threaded to receive a lock nut 47. The remainder of the spring mount is identical with that already described.

In operation the mount may be adjusted laterally and vertically by manipulating the knobs 34 and 38, respectively. When it is desired to adjust the tension in the member 43 the knob 47 is loosened and the collar 44 may then be rotated, either clockwise or counter-clockwise, as desired. When the collar is in the desired angular position, the lock nut 47 is screwed to lock the collar 44 and stud 46 together. This adjustment serves to give an initial approximate equalization of the tension of the two members 43. To obtain a precise balance, the knobs 30 are turned, moving the entire spring mount toward or away from the center of the balance, depending on the direction of rotation.

The compensation of the restoring forces, as has been indicated, is accomplished by the springs 20 or equivalent structure. These members introduce a force which acts in a direction to oppose the restoring forces in the suspension and insure a delicately balanced system. The force introduced by a spring will vary as the tension in the spring, which is practically constant for a given adjustment and the perpendicular distance from the center of oscillation to the spring. This second factor varies approximately as the displacement of the bar 16 for small angles. As has been pointed out, adjustments are provided by which the tensions in the two springs may be equalized and by which the perpendicular distance from the center of oscillation to the spring may be varied. Thus, I am enabled to secure an accurate balance of the bar and to vary the position of the springs to secure any desired compensating torque so as to attain the maximum sensitivity for the particular instrument.

Greater sensitivity may be imparted to seismometers for measuring the vertical motion of the ground by the application of the principles of this invention. Such a seismometer which is essentially a pendulum balanced in a horizontal position, can be mounted easily on pivot bearings, or, like the balance hereinbefore described, can be suspended by a torsion member. In Figs. 6 to 10 I have shown an example of the application of the principle employed in a seismometer.

In Fig. 6 there is shown a seismometer comprising a frame 48 and a horizontal boom 49 mounted thereon to control the amplitude of oscillation of the seismometer. The frame 48 is provided with a flat base 50 and horizontally extending arms 51. Secured to the top face of each arm are a plurality of bearing seats 52. These are adapted to nest the concave jewel bearing 53 in which are seated the pivot members 54. The pivots are attached to the member 55 in any suitable manner. It will be understood that this mounting merely exemplifies one type that may be used. The principles of this invention are applicable equally to any types of balances.

The member 55 is provided with the heavy bobs or weights 56 which serve as steady masses of the pendulum. These should be so positioned that their weight will be equally distributed on the bearing pivots 54. As is well understood the action of the seismometer depends on the inertia of the steady mass or equivalents. As the point of support is suddenly moved (with the earth) the suspended body, due to its inertia, momentarily retains its initial position. It is essential that the restoring force which tends to move the steady masses to their new position of equilibrium be a minimum, which is equivalent to a slow period of vibration. The device herein shown effectively embodies this principle. As will be described more fully, means are provided for reducing these restoring forces to a minimum.

The pivot member 55 is formed with vertical extensions 57, the lower one of which is adapted to pass through a slot 58 in the frame 48. At each free end the arm is provided with a bearing seat 52 and a cup bearing 53, which may be similar in construction to that employed on the frame 51 (see Fig. 10). The purpose of such a bearing is to reduce to a minimum the inaccuracies due to friction, and hence, any construction which serves this purpose may be employed in place of that shown and described. The jewel bearings are adapted to receive the hooked ends of helical springs 59 and 60. These springs and their adjustable mounts are identical, and hence, only one will be described. The other end of the spring engages a similar bearing carried by an adjustable spring mount, designated generally by the numeral 62 (Fig. 6).

The spring mount is supported on the frame member 48 close to the pivot member 55. This may be adjusted so that the line from the pivot of the bar, through the lower spring pivot, is substantially at right angles to the line of suspension of the spring. By this arrangement I am enabled to so adjust the compensating torque as to obtain a very high degree sensitivity of the balance.

The mounting means for the spring comprises a plate 63 having an integral guide bar 64. As shown, particularly in Fig. 8, the bar is adapted to slide laterally in an aperture of the frame piece 48. This bar serves as a support for the spring mount. It will be appreciated that the frame piece may be provided with an elongated bearing for the guide bar which may be of such a diameter as to insure a snug fit and thereby prevent any lateral play between these two members. The lower portion of the plate 63, as viewed in Fig. 8, is formed as an enlarged shoulder 65 which is drilled to present two perpendicular bores, for a purpose to appear presently.

The vertical sides of the plate are so shaped as to form a dovetail channel 66, which extends from the upper end down to the top face of the shoulder 65. Received in this groove is the spring supporting block 67. As will be noted from an inspection of the drawings, this supporting member is provided with a bearing seat 52 which carries a cup bearing 53. The sides of the member 67 are so designed as to conform to the shape of the channel 66 in which it is received.

It will be perceived that the tension of the spring 59 may be varied by adjusting the spring supporting block in a vertical direction. The dovetail connection allows such vertical movement but prevents movement in any other plane.

The means to guide the supporting block comprise essentially a screw member 68 which cooperates with the block 67 and the shoulder 65. The vertical bore in the shoulder is grooved to receive the threads on the shaft. At its upper end, the shaft has a reduced tip 69 in which is cut a circumferential groove 70. A set screw 71 registers with the groove 70 to prevent longitudinal movement of the screw 68 with respect to the spring support block 67. The lower extremity of the adjusting screw is provided with a knurled knob 72 to facilitate rotation.

It will now be apparent that the tension in the spring 59 may be adjusted by rotation of the screw 68. Such rotation will cause the screw to move axially in the shoulder 65 carrying with it the spring block 67. During such movement the dovetail protrusion of the block will slide over the channel faces of the plate 65 to allow longitudinal and prevent lateral movement.

As has been indicated, the plate 63 is likewise adapted for lateral movement with respect to the frame piece 48. To accomplish this an adjusting screw 73 is provided. This screw is threaded in the frame piece 48 and is formed, like screw 68, with a knob 74 and a peripheral groove 75. A set screw 76 engages the faces of the groove and the shoulder 65 to prevent longitudinal movement between the two.

It is manifest that upon rotation of the screw 73 the plate 63 will be forced toward or away from the frame piece 48. During this movement the guide bar 64 slides in its bearing on the frame member.

The stress imposed upon the plate 63 by the tensioned spring is resisted by the guide bar 64. Hence, as the adjusting mechanism comprising screws 68 and 73 is not subjected to any distorting force it may be finely machined to insure accurate adjustment.

Seismometers can be compensated for temperature changes by properly positioning a sensitivity spring with respect to the balancing spring. Such a device consists essentially of a horizontal arm pivoted at one end to a fixed support. Attached to a point vertically spaced above the pendulum arm is a balancing spring, the other end of which is secured to the free end of the pendulum arm. When such a system is subjected to temperature changes the balancing spring is retracted or elongated and thus tends to rotate the pendulum arm out of its equilibrium position. Compensation for this error may be had by providing a sensitivity spring which may be so mounted as to neutralize the described effects of temperature changes. To accomplish this, the sensitivity spring is attached at one extremity to the free end of the pendulum and at its other end to a vertically moveable support positioned adjacent the pivotal point of the pendulum. This latter end of the sensitivity spring may then be moved either above or below the center of oscillation of the pendulum to effect rotation in a direction counter to that caused by the change in length of the balancing spring.

It will be seen that this same result may be obtained in the device shown in the drawings. If, under the influence of change in temperature, the spring 59 expands or contracts, the spring 60, through the intermediacy of the members 52 and 68 may be adjusted to counteract these changes and thus maintain the equilibrium position of the pendulum arm.

If necessary, a high degree of sensitivity can be attained in a single spring suspension, which embodies to the best advantage the principle of the sensitivity spring and the balancing spring. In such a case the spring would be attached at one end to the free end of the pendulum arm and secured at its other end to the desirable point with respect to the center of oscillation. It is advisable in such a modification that the spring and the pendulum arm be as nearly equal in length as possible. When such a relation is obtained, the arcs described by the ends of the spring and the pendulum arm show a smaller deviation than when placed in any other position. Since deviations are measures of restoring forces this position gives maximum sensitivity.

The desirable position referred to is that which has been explained heretofore. This position of the spring is such that a line through the pivotal point of the pivot boom and the point of the adjacent spring suspension is substantially perpendicular to the line of suspension of the spring, as will be appreciated from the following illustration:—(See Figure 11)

$K$—force necessary to elongate spring unit length.
$u$—elongation of spring.
$F$—$uK$.
$S$—length of spring.
$L$—length of pendulum.
$d$—distance between pendulum and spring pivots.
$p$—perpendicular distance from pendulum pivot to line of spring.
$T$—resultant torque.
$\theta$—angle between $d$ and $L$.

The fundamental equation is $$T = Fp. \Delta T = F\Delta p + p\Delta F$$

$$\Delta p = \frac{dL \cos \theta}{S} \Delta \theta$$

$$\Delta F = K\Delta S = \frac{KdL \sin \theta}{S} \Delta \theta$$

$$\frac{\Delta T}{\Delta \theta} = \frac{FdL \cos \theta}{S} + \frac{pKdL \sin \theta}{S} = pF \cot \theta + Kp^2$$

$$\frac{d}{S} = \frac{\sin \alpha}{\sin \theta} = \frac{p}{L \sin \theta}$$

$$p = \frac{dL \sin \theta}{S}$$

$$\Delta S = \frac{dL \sin \theta}{S} \Delta \theta$$

$$S^2 = d^2 + L^2 - 2dL \cos \theta$$

$$d = \frac{pS}{L \sin \theta} = B$$

The greatest sensitivity is attained when $$pF \cot \theta + kp^2 = 0$$

or $$\tan \theta = -\frac{F}{Kp} = -\frac{u}{p}$$

In practice this angle Θ lies between about 75° and 90°, and S and L are nearly equal.

When L and S are nearly equal the arcs described by L and S show smaller deviation from each other than when in any other balancing position. As the deviations are measures of restoring forces, this position gives maximum sensitivity.

While these desirable results may be obtained in a single spring suspension, I prefer to use the double spring type, as shown. This insures a more rugged structure which is susceptible of easier adjustment. It is to be understood, however, that the principle of utilizing a sensitivity spring to assure an exact balance of the pendulum arm is applicable to either type, i. e., the sensitivity factor and the balancing factor may be incorporated in one spring, or separate springs may be employed, as shown.

It will be understood that while a compensated vertical pendulum has been shown and described the essential features of compensation are applicable with equal propriety to other types such for example as the horizontal and simple vertical pendulums.

While I have herein shown and described the preferred embodiments of my invention it is to be understood that these are merely for the purposes of exemplification for since the underlying principles may be incorporated in other specific (mechanical) structures I do not intend to be limited to those shown except as such limitations are clearly imposed by the appended claims.

I claim:

1. A device of the class described comprising an oscillable member means supplying forces to restore said oscillating member to its position of neutral equilibrium and a resilient means substantially parallel and coacting with the member to oppose the restoring forces in the mounting means.

2. A torsion balance comprising a suspended arm, means connected with the suspension for restoring said arm to a position of neutral equilibrium and means substantially parallel with and connected to the arm to oppose the restoring effect of the suspension.

3. A balance of the character described comprising a bar, a torsion suspension for the bar, a plurality of springs, each spring connected at one end to the bar at a point spaced from the center of oscillation, and at its other end to a fixed support and means to vary the tension and position of the spring.

4. A balance of the character described comprising a bar, means to mount the bar for oscillation, spring means connected to the bar to oppose the restoring forces of the suspension and means to vary the position and tension of the spring means.

5. In a balance bar mounted for oscillation, a counterpoise and a compensating spring connected to said bar, a mounting for said spring, and means to adjust the mounting in three directions.

In testimony whereof I affix my signature.

FRANK NEUMANN.